(12) United States Patent
Fernandez Ortega

(10) Patent No.: US 8,484,157 B2
(45) Date of Patent: *Jul. 9, 2013

(54) COMPENSATING FOR UNBALANCED HIERARCHIES WHEN GENERATING OLAP QUERIES FROM REPORT SPECIFICATIONS

(75) Inventor: Ariel Fernandez Ortega, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/620,827

(22) Filed: Sep. 15, 2012

(65) Prior Publication Data

US 2013/0013554 A1 Jan. 10, 2013

Related U.S. Application Data

(63) Continuation of application No. 12/628,886, filed on Dec. 1, 2009.

(51) Int. Cl.
- *G06F 7/00* (2006.01)
- *G06F 17/00* (2006.01)
- *G06F 17/30* (2006.01)

(52) U.S. Cl.
USPC ............ 707/603; 707/602; 707/769

(58) Field of Classification Search
None
See application file for complete search history.

(56) References Cited

U.S. PATENT DOCUMENTS

| | | | |
|---|---|---|---|
| 6,549,907 B1 | 4/2003 | Fayyad et al. | |
| 7,139,766 B2 | 11/2006 | Thomson et al. | |
| 7,181,440 B2 * | 2/2007 | Cras et al. | 1/1 |
| 7,181,450 B2 | 2/2007 | Malloy et al. | |
| 7,222,130 B1 * | 5/2007 | Cras et al. | 707/803 |
| 7,571,182 B1 * | 8/2009 | Eddy | 1/1 |
| 7,945,597 B2 * | 5/2011 | Cras et al. | 707/803 |
| 2004/0039736 A1 * | 2/2004 | Kilmer et al. | 707/3 |
| 2007/0088689 A1 | 4/2007 | Cras et al. | |
| 2007/0118516 A1 | 5/2007 | Li et al. | |
| 2007/0271227 A1 | 11/2007 | Momen-Pour et al. | |
| 2008/0243778 A1 | 10/2008 | Behnen et al. | |
| 2010/0312748 A1 * | 12/2010 | Dickerman et al. | 707/602 |
| 2011/0131173 A1 | 6/2011 | Fernandez Ortega | |

FOREIGN PATENT DOCUMENTS

| | | |
|---|---|---|
| EP | 1482431 A2 | 12/2004 |
| EP | 1482432 A2 | 12/2004 |

OTHER PUBLICATIONS

International Search Report and Written Opinion for Serial No. PCT/EP2010/067119 dated Feb. 9, 2011.

"Multidimensional Analysis with SAS: An Introduction and Overview", SAS International and SAS Americas, North Carolina, 2005: pp. 1-30, <http://www.sas.com/offices/europe/uk/downloads/olap.pdf>.

(Continued)

*Primary Examiner* — Pierre Vital
*Assistant Examiner* — Loan T Nguyen
(74) *Attorney, Agent, or Firm* — Patterson & Sheridan, LLP

(57) ABSTRACT

Systems, methods and articles of manufacture are disclosed for generating an online analytical processing (OLAP) query against a cube. The cube may have dimensions, each dimension having a hierarchy of members. A report specification may be received against a hierarchy of the cube. An OLAP query may be generated from the report specification. The OLAP query may include projected members not having any descendant at the detail level of the hierarchy, thus producing more accurate results.

20 Claims, 7 Drawing Sheets

OTHER PUBLICATIONS

Eavis et al., MapGraph: Efficient Methods for Complex OLAP Hierarchies ACM Digital Library, Nov. 2007, pp. 465-474., Published online.

Tseng, FSC., "Design of a Multi-Dimensional Query Expression for Document Warehouses", Inspec/Information Sciences, vol. 174, No. 1-2, pp. 55-79, Jun. 28, 2005.

Torben B. Pedersen, "Aspects of Data Modeling and Query Processing for Complex Multidimensional Data", 2000, pp. 1- 180, Aalborg University, Denmark.

* cited by examiner

```
GENERATE (
    [Geography].[Country].MEMBERS,
    {
        HEAD(
            {[Geography].CURRENTMEMBER},
            COUNT(
                HEAD(
                    FILTER(
                        DESCENDANTS(
                            [Geography].CURRENTMEMBER,
                            [Geography].[City] ),
                        ([Measures].[Quantity]) < 10000) AS [XQE_SA0] ) ) ),
        [XQE_SA0],
        FILTER(
            HEAD(
                {[Geography].CURRENTMEMBER},
                IIF(
                    COUNT(
                        HEAD(
                            DESCENDANTS(
                                [Geography].CURRENTMEMBER,
                                [Geography].[City])
                            ),
                            IncludeEmpty) = 0,
                        1,
                        0
                    )
                ),
            ([Measures].[Quantity]) < 10000
        )
    },
    ALL
)
```

702 braces the HEAD(...COUNT(...)) block
708 points to [XQE_SA0], FILTER(
704 braces the HEAD(...IIF(...)) block

```
WITH
   MEMBER
      Geography. RH02.XQE_RS_CM0 AS '
      COUNT(                                                    800
         Geography.RH02.Continent.MEMBERS,
         IncludeEmpty)',
      SOLVE_ORDER = 4
SELECT
   {GENERATE(
      Geography.RH02.Continent.MEMBERS,
      {
         HEAD ({Geography.RH02.CURRENTMEMBER},
               COUNT(
                  HEAD(
   802              DESCENDANTS(
                     Geography.RH02.CURRENTMEMBER,
                     Geography.RH02.Country) AS
                  XQE_SA0))),
         XQE_SA0,
         HEAD(
            {Geography.RH02.CURRENTMEMBER},
            IIF(
               COUNT(
                  HEAD(
   804              DESCENDANTS(
                     Geography.RH02.CURRENTMEMBER,
                     Geography.RH02.Country)),
                  IncludeEmpty) = 0,
               1,
               0))
      },
      ALL) AS
   XQE_SA1,
   HEAD(
      {Geography.RH02.XQE_RS_CM0}'
      COUNT(
         HEAD(
            XQE_SA1,
            IncludeEmpty))}
   ON AXIS(0)
FROM
   Automobile_C01
```

FIG. 8

COMPENSATING FOR UNBALANCED HIERARCHIES WHEN GENERATING OLAP QUERIES FROM REPORT SPECIFICATIONS

CROSS-REFERENCE TO RELATED APPLICATIONS

This application is a continuation of co-pending U.S. patent application Ser. No. 12/628,886, which was filed on Dec. 1, 2009 and which is incorporated herein by reference in its entirety.

BACKGROUND

Embodiments of the invention relate to computer-based multidimensional data modeling. More specifically, embodiments of the invention relate to generating queries for an online analytical processing (OLAP) system.

DETAILED DESCRIPTION

Many companies today store vast amounts of data in online transaction processing (OLTP) systems and other databases. For example, the data may include business data such as sales, product, and financial data. Decision-makers frequently rely on such data in making business decisions.

However, unlike OLTP systems, which typically capture transaction data for a business, online analytical processing (OLAP) systems analyze the transaction data at an aggregate level to further inform decision-making. For example, a business analyst may interpret data aggregated across various business dimensions in an OLAP system. The business analyst may browse, in various contexts, data from the OLAP system. For instance, the business analyst may view sales by product by customer by time, defects by manufacturing plant by time, etc.

Generally, OLAP allows multidimensional analysis of data. That is, OLAP provides data in a form of "views" or "dimensions" that are organized to reflect a multidimensional nature of the data. An OLAP system typically includes data models that allow business analysts to interactively explore data across multiple viewpoints at multiple levels of aggregation, also referred to as levels. An increasingly popular data model for OLAP systems is a data cube (or simply, cube). An OLAP system may store a number of cubes. Each cube includes a set of dimensions (e.g., Time, Geography, Product, etc.). A dimension typically comprises many levels, and the levels are typically hierarchical (e.g., Month, Quarter, and Year for the Time dimension; City, Province, and Country for the Geography dimension, etc.).

SUMMARY

One embodiment of the invention includes a method. The method may include configuring one or more computer processors to perform an operation for generating an online analytical processing (OLAP) query against a cube. The cube may have a plurality of dimensions, and each of the plurality of dimensions may include a hierarchy of members. The operation may generally include receiving a report specification and identifying a first set of the plurality of members of the hierarchy. The first set may include members projected by the report specification that have a descendant at a detail level of the hierarchy. The method may also include identifying a second set of the plurality of members, distinct from the first set. The second set may include members projected by the report specification that do not have any descendant at the detail level of the hierarchy; and generating the OLAP query from the report specification, wherein the OLAP query joins the first set of members of the hierarchy with the second set of members of the hierarchy by performing a union operation.

Another embodiment of the invention includes a computer-readable storage medium containing a program, which, when executed on a processor, performs an operation for generating an online analytical processing (OLAP) query against a cube. The cube may have a plurality of dimensions, and each of the plurality of dimensions may include a hierarchy of members. The operation may generally include receiving a report specification; identifying a first set of the plurality of members of the hierarchy, wherein the first set comprises members projected by the report specification that have a descendant at a detail level of the hierarchy; identifying a second set of the plurality of members, distinct from the first set, wherein the second set comprises members projected by the report specification that do not have any descendant at the detail level of the hierarchy; and generating the OLAP query from the report specification, wherein the OLAP query joins the first set of members of the hierarchy with the second set of members of the hierarchy by a union operation.

Still another embodiment of the invention includes a system having one or more computer processors and a memory containing a program, which when executed by the one or more computer processors is configured to perform an operation for generating an online analytical processing (OLAP) query against a cube. The cube may have a plurality of dimensions, and each of the plurality of dimensions may include a hierarchy of members. The operation may generally include receiving a report specification against a hierarchy of the cube; identifying a first set of the plurality of members of the hierarchy, wherein the first set comprises members projected by the report specification that have a descendant at a detail level of the hierarchy; identifying a second set of the plurality of members, distinct from the first set, wherein the second set comprises members projected by the report specification do not have any descendant at the detail level of the hierarchy; and generating the OLAP query from the report specification, wherein the OLAP query joins the first set of members of the hierarchy with the second set of members of the hierarchy by a union operation.

BRIEF DESCRIPTION OF THE SEVERAL VIEWS OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 7 illustrates an OLAP query converted with compensation from the report specification, according to one embodiment of the invention.

FIG. 8 illustrates an example of the OLAP query, according to one embodiment of the invention.

DETAILED DESCRIPTION

Figure 1:
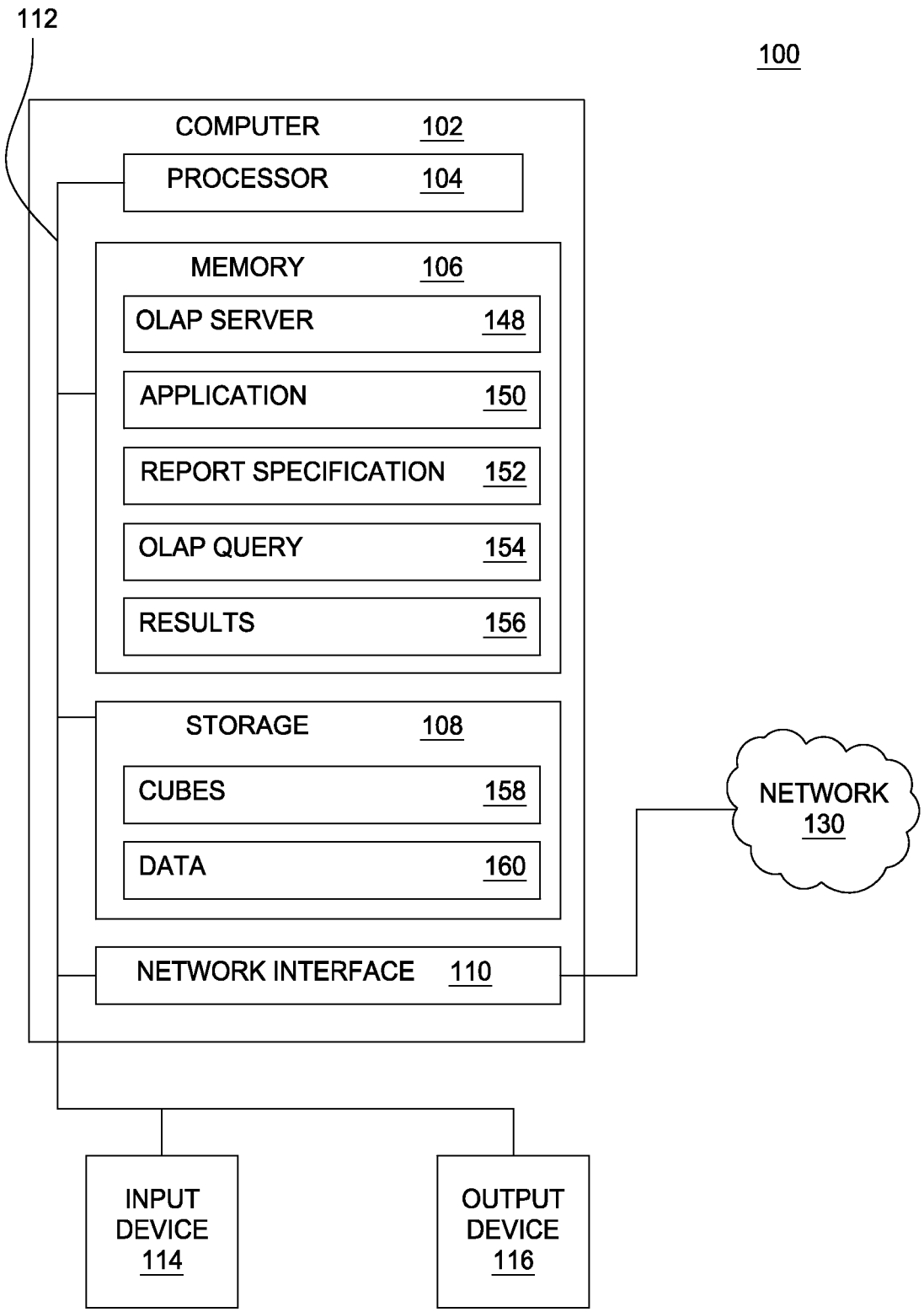
FIG. 1 is a block diagram illustrating a system for generating an OLAP query from a report specification, according to one embodiment of the invention.

Embodiments of the present invention generally provide techniques for generating an OLAP query from a report specification. One embodiment of the invention provides an application that interacts with the OLAP system. The application may compensate for how data in the OLAP system is organized, to produce more accurate results for the report specification.

In one embodiment, the application may receive a report specification for a dimensional hierarchy of a cube in an OLAP system. The application may determine whether the dimensional hierarchy and/or the report specification exhibit certain characteristics likely to yield incomplete and/or inaccurate results. In particular, the application may identify an unbalanced dimensional hierarchy underlying a report specification. In such cases, the application may compensate for these characteristics in generating an OLAP query from the report specification (i.e., to prevent incomplete or inaccurate results). In particular, the application may compensate for the characteristics prior to executing any OLAP query. By compensating prior to (rather than subsequent to) executing an OLAP query, the application may more easily distinguish: (i) a member being correctly excluded for failing to satisfy a filter in the report specification from (ii) a member being incorrectly excluded due to the structure of the hierarchy. Further, the application may perform compensation only as the application deems necessary (based on the report specification and/or the hierarchy), thus reducing processing overhead incurred from compensation.

OLAP systems typically aggregate data across various dimensions at various levels to provide different views of the data at different levels of aggregation. The data may be aggregated over various periods of time, by geography, by teams and by product, depending on the type and organization of the business. Aggregated data is commonly referred to as an aggregation. For example, an aggregation may be the sales data for the month of July for a specified product. A slice typically comprises a level from at least a subset of dimensions, and aggregations are typically associated with a slice.

Further, each dimension of a cube includes a number of members. The members of a dimension may be organized into a hierarchy by the levels of the dimension. For example, a cube may include a Geography dimension having members representing various geographic locations (e.g., Canada, France, etc.). A member representing Ottawa (existing at the City level of the hierarchy of the geography dimension) may be arranged in the hierarchy as a child member of a member representing Ontario (existing at the Province level of the hierarchy). Similarly, the member representing Ontario may, in turn, be arranged in the hierarchy as a child member of a member representing Canada (existing at the Country level of the hierarchy).

A cube may also include measures, i.e., metrics aggregated along dimensional hierarchies of the cube. For example, a cube may include a Total Sales measure for various products over various time periods. Similarly, the cube may also include an Average Sales measure. A user may query an individual cell of the cube by identifying a member in each dimension and a measure.

Typically, business analysts issue OLAP queries to retrieve data and may request aggregations at various levels. If the aggregations are not available, then the OLAP system may compute the aggregations in real-time. Because computing aggregations may be time consuming, various OLAP systems store pre-computed aggregations to process OLAP queries more efficiently.

Examples of operations typically supported by OLAP systems include calculation and modeling applied across dimensions through hierarchies or across members, trend analysis over sequential time periods, slicing subsets for on-screen viewing of the data, drill-down to deeper levels of consolidation of the data, reach-through to underlying detail data, and rotation to new dimensional comparisons in a viewing area associated with the data. An example of an OLAP system is InfoSphere™ Warehouse Cubing Services, available from International Business Machines Corp. (IBM®) of Armonk, N.Y.

In processing an OLAP query, an OLAP server (of an OLAP system) may derive a value of a cell in a cube from data residing outside of the cubes of the OLAP system. For example, the data may reside in an underlying (relational) database. To produce a cell value, an OLAP server may analyze a cell to determine which measure and what members from other dimensions are associated with the cell. Further, if the cell value is not available (i.e., has not been precomputed, or is out of date relative to the underlying data), the OLAP server may generate a relational database query to determine the cell value from the database. The relational database query may aggregate database rows matching dimensional criteria (e.g., rows associated with a time period and product of the cell). An example of a query language for OLAP systems is Multidimensional Expressions (MDX) from Microsoft® Corp. of Redmond, Wash. An example of a query language for relational databases is Structured Query Language (SQL). For instance, in processing an MDX query against a cube, the OLAP server may generate an SQL query from dimension members and from a measure associated with a cell of the cube. As a result, the relational database aggregates only data relevant to the cell (e.g., based on constraints in a WHERE clause of the SQL statement) and returns the aggregated data to the OLAP server. In general, OLAP queries can fetch data at multiple levels of aggregation, and in one embodiment, one SQL query is generated for each distinct level of aggregated data reference by or contained in the OLAP query.

Further, the OLAP system may interact with other applications to provide users with additional functionality for analyzing and reporting data. Examples of such applications include IBM® Cognos® and SAP® Business Objects™. These applications may provide users with a variety of tools for analyzing data and building reports. For example, these applications may receive a report specification from a user. These applications may convert the report specification into one or more queries to underlying data sources. For example, an application may convert the report specification into one or more OLAP queries. In some cases, however, depending on how a dimensional hierarchy is structured, a report specification on the dimensional hierarchy may yield incomplete and/or inaccurate results.

While embodiments may be described herein with reference to an application that interacts with the OLAP system, other embodiments are broadly contemplated. For example, in one embodiment, the OLAP system itself generates an OLAP query from a report specification using the techniques described herein.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram illustrating a system 100 for generating an OLAP query from a report specification, according to one embodiment of the invention. The networked system 100 includes a computer 102. The computer 102 may be connected to other computers via a network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system. Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single entity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a hard disk drive storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards. Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 of the computer 102 includes an OLAP server 148, an application 150, a report specification 152, an OLAP query 154, and results 156 from executing the OLAP query 154. The storage 108 of the computer 102 includes cubes 158 and data 160.

In one embodiment, the OLAP Server may be a software application that summarizes vast amounts of detailed data to provide access to summarized data (in the form of cubes 158). The detailed data, or simply data 160, may be stored in a relational database. The OLAP server 148 may generate the cubes 158 from the data 160 and store the cubes 158 in a dimensional data store. Further, the OLAP server 148 may precompute one or more cells of the cube 158 by querying the relational database. The precomputed cells may be stored in the cube 158. In one embodiment, both the data 160 and the cubes 158 may be stored in a relational database.

In one embodiment, the application 150 interacts with the OLAP server 148 to provide users with additional functionality for analyzing and reporting data. For example, the application 150 may create a report for a user based on a report specification 152. The report specification 152 may be simpler to create than the OLAP query 148. That is, users with less technical knowledge than typically required to compose an OLAP query 148 may nevertheless be able to create a report specification 152. The report specification 152 may be written in a reporting language that hides intricacies of the OLAP query language (e.g., MDX) from the user.

In one embodiment, the application 150 converts the report specification 152 into the OLAP query 154. If specific characteristics of the dimensional hierarchy of the cubes 158 (and/or of the report specification) are present, the OLAP query 154 may retrieve inaccurate and/or incomplete results. For example, if (i) the OLAP query 154 includes a filter at a detail level of the dimensional hierarchy and (ii) the dimensional hierarchy either: (A) is unbalanced or (B) is balanced but appears unbalanced for the purposes of the report (i.e., the lowest level projected by the report specification appears unbalanced), then the filter may incorrectly exclude (from results for the query 154) a member of the dimensional hierarchy having no descendant at the detail level. Accordingly, the application 150 may detect and compensate for the characteristics in converting the report specification 152 into the OLAP query 154. Consequently, the application 150 may generate an OLAP query 154 that retrieves results that are more accurate and/or complete.

Generally, a hierarchy may be considered "unbalanced" if there is at least one member: (i) that is not at the lowest (i.e. bottommost) level of the hierarchy and (ii) that has no children. In other words, the hierarchy is unbalanced if it includes at least one leaf member that is not at the lowest level of the hierarchy. Further, a hierarchy is "ragged" if it includes at least one parent-child relationship that skips a level. In other words, the hierarchy is ragged if at least one member has a child at a level other than immediately below it. Further, a ragged, balanced hierarchy may nevertheless be unbalanced for the purposes of a report if there is at least one member not at the lowest (i.e., bottom most) level of the portion of the hierarchy designated by the report specification 152.

Figure 2:
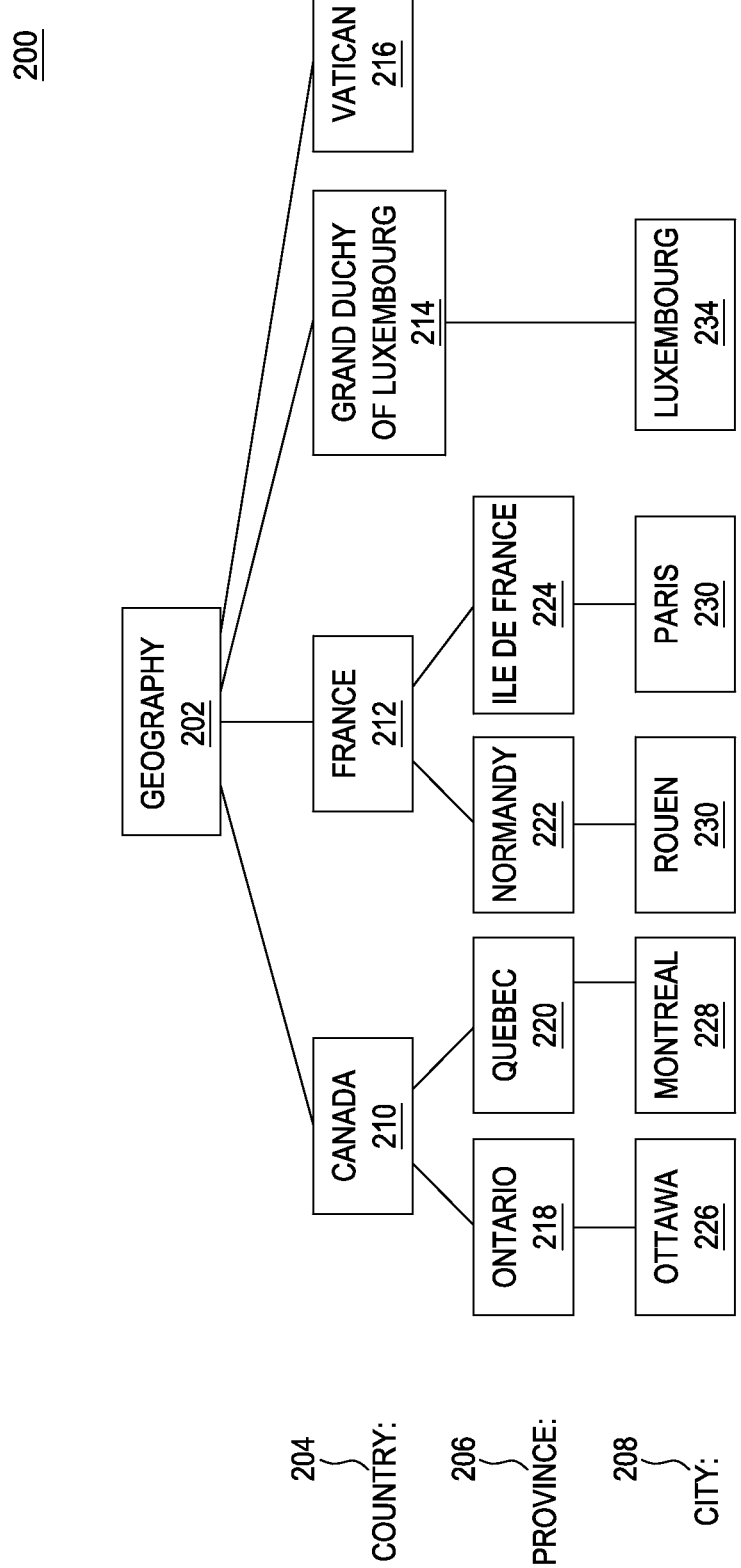
FIG. 2 illustrates a hierarchy for a Geography dimension of a cube, according to one embodiment of the invention.

To illustrate the concepts of a balanced hierarchy, an unbalanced hierarchy, and a ragged hierarchy, FIG. 2 illustrates a hierarchy 200 for dimensions of a cube FIG. 1, according to one embodiment of the invention. In this example, the cube represents a hierarchy for a geographic dimension of a set of cube data. Assume that such a cube may also have dimensions for time and product. Also note, although referred to as a cube, the dimensional nature of an OLAP cube may be extended to N dimensions. As shown, the hierarchy 200 includes fourteen members. Illustratively, the fourteen members include: Geography 202, Canada 210, France 212, Grand Duchy of Luxembourg 214, Vatican 216, Ontario 218, Quebec 220, Normandy 222, Ile de France 224, Ottawa 226, Montreal 228, Rouen 230, Paris 232, and Luxembourg 234. Further, Geography 202 resides at a first level (representing all geographic locations) of the hierarchy 200. Canada 210, France 212, Grand Duchy of Luxembourg 214, and Vatican 216 reside at a second level that represents Country 204. Ontario 218, Quebec 220, Normandy 222, and Ile de France 224 reside at a third level that represents Province 206. Ottawa 226, Montreal 228, Rouen 230, Paris 232, and Luxembourg 234 reside at a fourth level that represents City 208.

As shown in the hierarchy 200, child members of Geography 202 include Canada 210, France 212, Grand Duchy of Luxembourg 214, and Vatican 216. Similarly, child members of Canada 210 include Ontario 218 and Quebec 220. Child members of France 212 include Normandy 222 and Ile de France 224. A child member of Grand Duchy of Luxembourg is Luxembourg 234. A child member of Ontario 218 is Ottawa 226. A child member of Quebec 220 is Montreal 228. A child member of Normandy 222 is Rouen 230. A child member of Ile de France 224 is Paris 232.

As described above, a hierarchy is unbalanced if there is at least one leaf member that is not at the lowest level of the hierarchy. For example, Vatican 216 of the hierarchy 200 is a leaf member that is not at the lowest level of the hierarchy (i.e., City 208). Thus, the hierarchy 200 is unbalanced. However, if not for Vatican 216, the hierarchy 200 would be balanced.

As described above, a hierarchy is ragged if at least one member has a child at a level other than immediately below it. For example, Grand Duchy of Luxembourg 214 (at the Country 204 level) has a child Luxembourg at the level representing City 208. In other words, the parent-child relationship between Grand Duchy of Luxembourg 214 and Luxembourg 234 skips the level representing Province 206. Thus, the hierarchy 200 is ragged. However, if not for this parent-child relationship, the hierarchy 200 would not be ragged. Further, a ragged, balanced hierarchy may nevertheless be unbalanced for the purposes of a report if there is at least one member not at the lowest (i.e., bottom most) level of the portion of the hierarchy designated by the report specification 152. For example, if the report specification may indicate that only Country 204 and Province 206 is to be included in the results 156. If at least one member at the Country 204 is a leaf member (and thus has no children at the Province 206 level), then the balanced hierarchy is referred to as being unbalanced for the purposes of the report.

Figure 3:
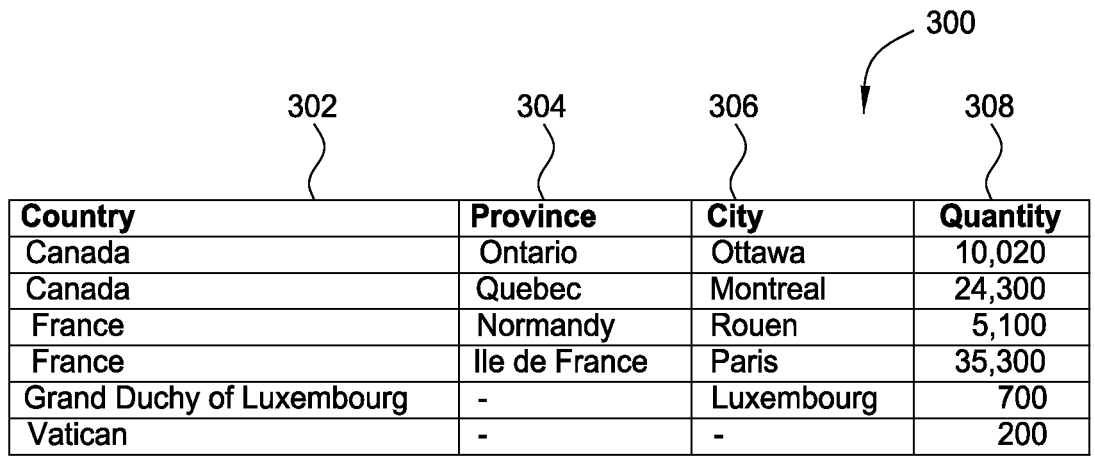
FIG. 3 is a table 300 showing quantity values for members of the hierarchy, according to one embodiment of the invention.

In one embodiment, the application 150 converts the report specification 152 for the hierarchy 200 into an OLAP query 154. However, if specific characteristics of the hierarchy 200 are present, the OLAP query 152 may yield results 156 that are inaccurate and/or incomplete. For example, the specific characteristics may be as follows: (i) that the OLAP query 154 includes a filter at a detail level of the dimensional hierarchy and (ii) that the dimensional hierarchy either: (A) is unbalanced or (B) is balanced but appears unbalanced for the purposes of the report (i.e., the lowest level projected by the report specification appears unbalanced). For example, suppose the report specification 152 inquires for a list of all countries and provinces having a quantity value that satisfies a specific condition. FIG. 3 is a table 300 showing quantity values for members of the hierarchy 200 of FIG. 2, according to one embodiment of the invention. As shown, the table 300 includes a Country field 302, a Province field 304, a City field 306, and a Quantity field 308. The table 300 indicates that Ottawa 226 has a quantity of 10,020. Further, Montreal 228 has a quantity of 24,300. Further, Rouen has a quantity of 5,100. Further, Paris has a quantity of 35,300. Further, Luxembourg has a quantity of 700. Further, Vatican has a quantity of 200.

Figure 4:
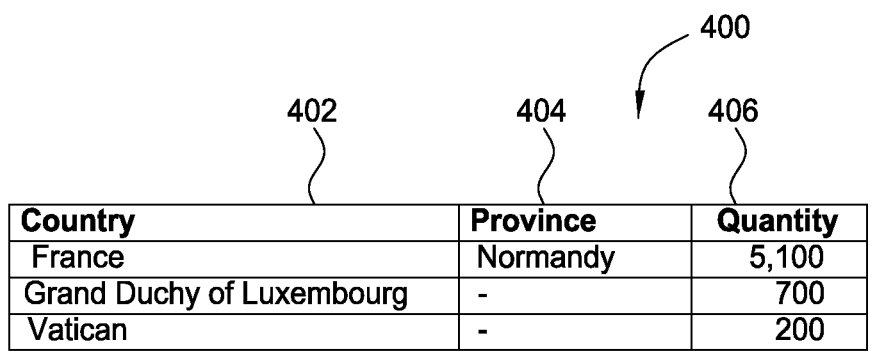
FIG. 4 is a table showing quantity values of countries and provinces satisfying the report specification, according to one embodiment of the invention.

Suppose the report specification 152 calls for a list of countries and provinces that have a quantity value of less than 10,000. FIG. 4 is a table 400 showing quantity values of countries and provinces satisfying the report specification 152, according to one embodiment of the invention. As shown, the table 400 includes a Country field 402, a Province field 404, and a Quantity field 406. The table 400 indicates that three countries and/or provinces satisfy the report specification 152. The three countries and/or provinces include Normandy (of France), Grand Duchy of Luxembourg, and Vatican. As shown, Normandy, Grand Duchy of Luxembourg, and Vatican have quantity values of 5,100, 700, and 200, respectively, each of which is less than the quantity value of 10,000 called for by the report specification 152. Accordingly, the list of countries and provinces responsive to the report specification 152 in this example include the Country field 402 and the Province field 404.

Further, users often expect members of the same hierarchy to be correlated in a report. In such cases, the report includes a list of countries and correlated provinces (rather than a first list of countries and a second list of provinces). In the example described above in conjunction with FIG. 4, the fields of the table 400 may be correlated in the report. For example, the Province cell of each row in the report may be correlated with the Country cell of the respective row in the report. The Province cell of each row may be, in turn, correlated with the Country cell of the respective row in the report.

As another example, suppose a report specification 152 projects regions and countries of the Geography hierarchy. The report specification 152 may also include conditions (e.g., quantity>200,000). Assume that the following regions satisfy the report specification: North America, Central America, and South America. Further, assume that the following countries satisfy the report specification 152: Canada, Mexico, and USA. Table I shows an example of uncorrelated members of a hierarchy in a report:

TABLE I

| Uncorrelated members example | |
|---|---|
| Region | Country |
| North America | Canada |
| Central America | Mexico |
| South America | USA |
| — | Costa Rica |
| — | Colombia |

In this particular example, while the report includes the regions and countries satisfying the report specification 152, the Country cell of each row in the report may not necessarily be correlated with the Region cell of the respective row in the report. For example, the country of USA is not correlated with the region of South America. In other words, the report merely includes a first list of regions and a second list of countries responsive to the report specification. As a result, such a report may be inconvenient for the users to read and/or comprehend.

To satisfy expectations of the users that members of the same hierarchy be correlated in the report, the application 150 may generate a report such as shown in Table II:

TABLE II

| Correlated members example | |
|---|---|
| Region | Country |
| North America | Canada |
| North America | Mexico |
| North America | USA |
| Central America | Costa Rica |
| South America | Colombia |

In this particular example, the report includes the regions and countries satisfying the report specification 152. Further, the Country cell of each row in the report is correlated with the Region cell of the respective row in the report. For example, the country of USA is correlated with the region of North America. As a result, such a report may be easier for the users to read and/or comprehend.

Referring back to FIG. 4, recall that Normandy, Grand Duchy of Luxembourg, and Vatican have quantity values of 5,100, 700, and 200, respectively, each of which is less than the quantity value of 10,000 called for by the report specification 152. However, the structure of the hierarchy 200 of FIG. 2 may cause the results 400 to exclude Grand Duchy of Luxembourg and/or Vatican. In this sense, the results 400 may be incomplete. Further, if the results 400 include a summary (e.g., total quantity), the summary may be inaccurate insofar as the summary did not take into account the (excluded) Grand Duchy of Luxembourg and/or Vatican.

Referring again to FIG. 2, Grand Duchy of Luxembourg 214 has no descendant at the level that represents Province 206. Instead, Grand Duchy of Luxembourg 214 has a descendant at the level that represents City 208. However, the report calls for countries and provinces (and not cities). In this situation, the quantity value of 700 associated with Luxembourg 234 (and thus indirectly associated with Grand Duchy of Luxembourg) may be erroneously excluded from the results 156.

Similarly, Vatican 216 has no descendant at the level that represents Province 206. Vatican 216 also has no descendant at the level that represents City 208. In this situation, the quantity value of 200 associated with Vatican 216 may also be erroneously excluded from the results 156.

Figure 5:
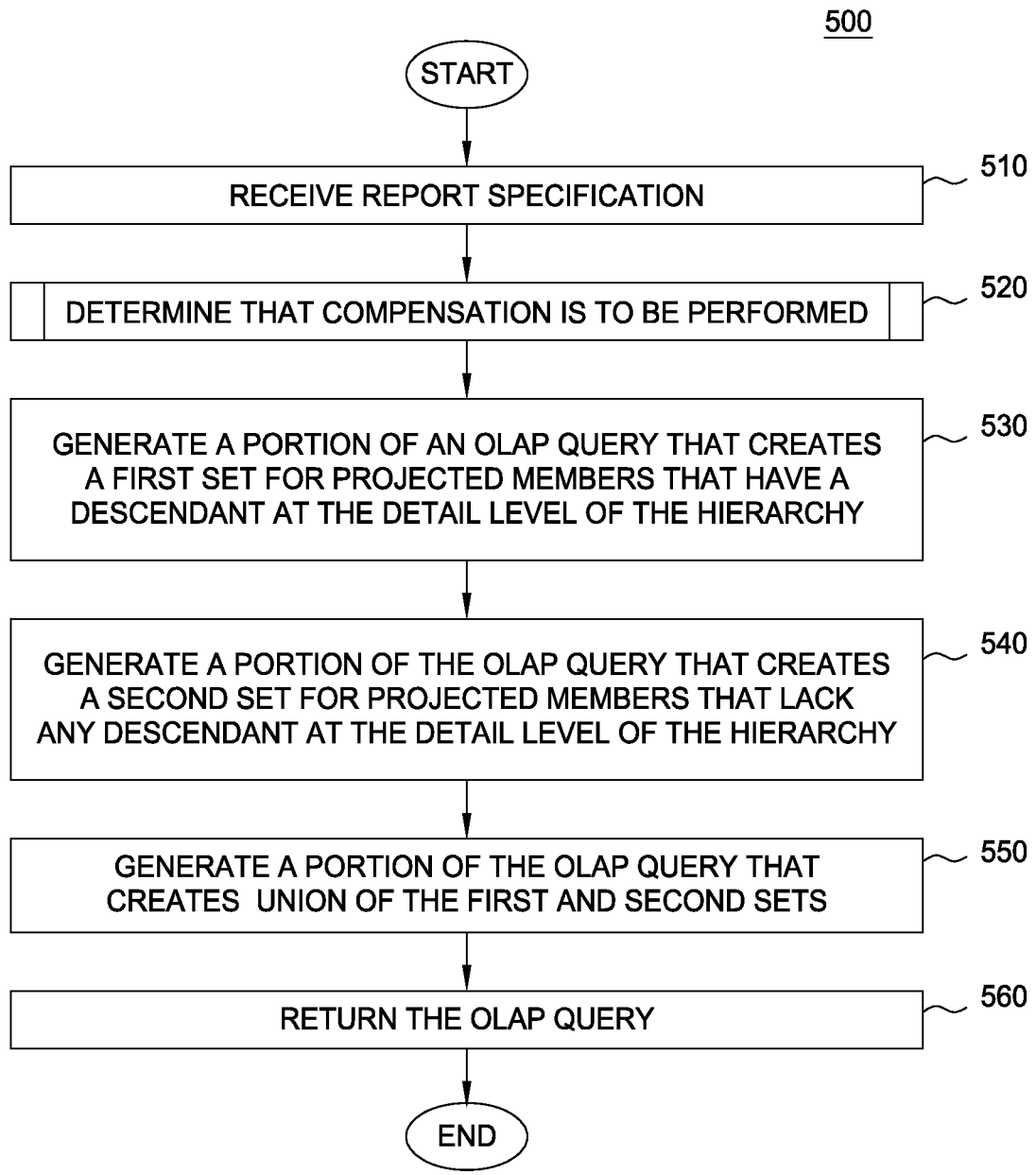
FIG. 5 is a flowchart depicting a method for generating the OLAP query from the report specification, according to one embodiment of the invention.

In one embodiment, if the report specification 152 summarizes or applies a filter to a hierarchy that is unbalanced (or appears unbalanced for the purposes of the report), the application 150 may compensate for such unbalancedness of the hierarchy to prevent members from being erroneously excluded from the results. FIG. 5 is a flowchart depicting a method 500 for generating the OLAP query 154 from the report specification 152, according to one embodiment of the invention. As shown, the method 500 begins at step 510, where the application 150 receives the report specification 152. Table III shows an example of the report specification 152:

TABLE III

| Report Specification Example (Filter) |
|---|
| COLUMN1 = Geography.Country.MEMBERS<br>COLUMN2 = Geography.City.MEMBERS<br>FILTER = Quantity <10,000 |

As shown, the report specification of Table III includes Country 204 and City 208 in the results 156. Further, the report specification applies a filter. The filter specifies that the associated quantity value of each City (or Country) in the results 156 must be less than 10,000.

At step 520, the application 150 may determine that compensation is to be performed in converting the report specification 152 to the OLAP query 154. The step 520 is further described below in conjunction with FIG. 6. In the following steps, the application 150 classifies members of the hierarchy into two sets and generates the OLAP query from the two sets. At step 530, the application 150 may generate a portion of the OLAP query 154 that creates a first set for projected members that have a descendant at the detail level of the hierarchy. As used herein, projected members refer to members at levels that are output as part of the results 156 (e.g., per the report specification 152). Further, the detail level of the hierarchy refers to the lowest level (e.g., City 208) of the hierarchy.

At step 540, the application 150 may generate a portion of the OLAP query 154 that creates a second set for projected members (e.g., Vatican 216) that do not have any descendants at the detail level of the hierarchy.

In one embodiment, in an operation that is separate from compensating for the unbalanced hierarchy, the application 150 may apply the filter to the two sets. For example, the portion of the OLAP query 154 that creates the first set also filters the first set at the detail level, according to one embodiment. That is, any filters of the report specification are applied at the detail level for the first set. Further, the portion of the OLAP query 154 that creates the second set also filters the second set at the level(s) of the projected members (rather than at the detail level), according to one embodiment. That is, any filters of the report specification are applied at an aggregate level (e.g., of projected members) for the second set.

At step 550, the application 150 may generate a portion of the OLAP query 154 that joins the first and second sets by union. At step 560, the application 150 may return and/or execute the OLAP query 154. Executing the OLAP query 154 produces the results 156. After the step 560, the method 500 terminates.

Figure 6:
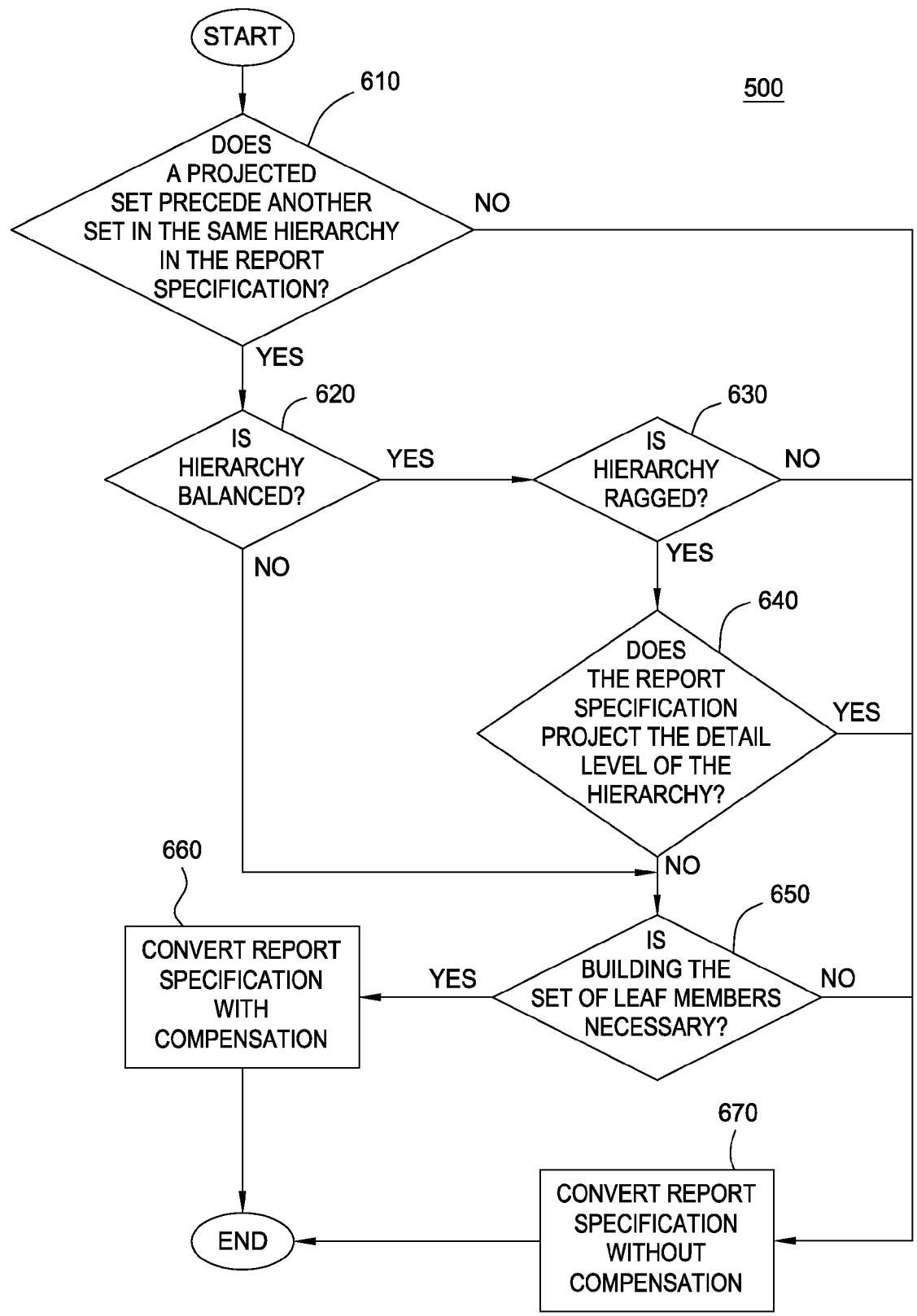
FIG. 6 is a flowchart depicting a method for determining whether compensating should be performed in converting the report specification to an OLAP query, according to one embodiment of the invention.

FIG. 6 is a flowchart depicting a method 600 for determining whether compensating should be performed in converting the report specification 152 to an OLAP query 154, according to one embodiment of the invention. The method 600 corresponds to the step 520 of FIG. 5. As shown, the method 600 begins at step 610, where the application 150 determines whether the report specification includes a projected set that precedes another set in a different level of the same hierarchy. That is, the application 150 determines whether the report specification projects different levels of the hierarchy. If not, the application 150 converts the report specification 152 without compensation (step 670).

Otherwise, the application 150 determines whether the hierarchy is balanced (step 620). If not, the application 150 determines whether it is necessary to build a set of leaf members for the hierarchy (step 650). For example, suppose the report specification does not indicate that any summary should be calculated for the selected level(s) of the hierarchy. Further, suppose the report specification does not designate any filter that removes members from the selected level(s) of the hierarchy. In such a case, the application 150 may determine that it is not necessary to build the set of leaf members for the hierarchy. Consequently, the application 150 may convert the report specification 152 without compensation (step 670). Otherwise, the application 150 converts the report specification 152 with compensation (step 660).

However, if the application 150 determines that the hierarchy is balanced (step 620), then the method 600 proceeds to step 630, where the application 150 determines whether the hierarchy is ragged. If not, the application 150 converts the report specification 152 without compensation (step 670).

On the other hand, if the application 150 determines (at step 630) that the hierarchy is ragged, the application 150 determines whether the report specification selects the lowest level of the hierarchy (step 640). If so, the application 150 converts the report specification 152 without compensation (step 670). Otherwise, the application 150 determines whether it is necessary to build a set of leaf members for the hierarchy (step 650). If so, the method 600 proceeds to the step 660 to convert the report specification with compensation. Otherwise, the method 600 proceeds to the step 670 to convert the report specification without compensation. After step 660 or step 670, the method 600 terminates.

FIG. 7 illustrates an OLAP query 700 converted with compensation from the report specification of Table III, according to one embodiment of the invention. The OLAP query 700 includes: (i) a first portion 702 that creates a first set of members for the results 156 and (ii) a second portion 704 that creates a second set of members for the results 156 (i.e., the "compensating" portion of the OLAP query 700). For example, the first set of members may include all members that have at least one descendant at the City level of the hierarchy. The second set of members may include members in the hierarchy that do not have any descendants at the City level of the hierarchy. For example, the second set of members may include Vatican 216.

As shown, the OLAP query 700 includes calls to MDX functions. The called MDX functions include COUNT( ), HEAD( ), FILTER( ), DESCENDANTS( ), IIF( ), and GENERATE( ). Of course, those skilled in the art will recognize that embodiments of the invention may be adapted to support other functions, OLAP query languages other than MDX, etc.

As is known, COUNT( ) is an MDX function that returns a number of cells in a set. Further, HEAD( ) is an MDX function that returns a first specified number of elements from a set, while retaining duplicates. Further, FILTER( ) is an MDX function that returns a set resulting from filtering a specified set based on a condition. Further, DESCENDANTS( ) is an MDX function that returns a set of descendants of a member at a specified level or distance. Further, IIF( ) is an MDX function that returns one of two values determined by a logical test. Further, GENERATE( ) applies a set to each member of another set and then joins the resulting sets by union.

In one embodiment, the application 150 may include calls to a sequence of the MDX functions to perform compensation in converting a report specification 152 to an OLAP query 154. For example, for the first set, the application 150 may include a call to the HEAD( ) function (e.g., the first portion 702) to select members of Country 204 that have descendants at the detail level that satisfy the condition quantity<10000. For the second set (the compensating set), the application 150 may also include a call to the HEAD( ) function (e.g., the second portion 704) to select members of Country 204 that do not have descendants at the level representing City 208. For instance, the application 150 may include a nested call to IIF( ) to include such members (i.e., members that are determined to have no descendants at the level representing City 208). The application 150 may also set an attribute to distinguish members of the first set from members of the second set. The application 150 may include a call to GENERATE( ) to combine the first and second sets. Accordingly, the OLAP query 700 prevents members from being erroneously excluded from the results.

Further, apart from compensating for the unbalanced hierarchy, the OLAP query 700 may filter the two sets (e.g., because the report specification includes a filter). For example, the first set of members may be filtered at the detail level of the hierarchy (e.g., using a call 708 to the FILTER( ) function). Further, the second set of members may be filtered at a projected level of the hierarchy according to the report specification 152 (e.g., using a call 708 to the FILTER( ) function).

As described above, if the report specification 152 summarizes or applies a filter to a hierarchy that is unbalanced (or appears unbalanced for the purposes of the report), the application 150 may compensate for such unbalancedness of the hierarchy to prevent members from being erroneously excluded from the results. An example of a report specification that applies a filter to the hierarchy has been described in conjunction with the report specification of Table III. Table IV shows an example of a report specification that summarizes members of a hierarchy:

TABLE IV

Report specification example (summary)

ROW1

COLUMN1 = Geography.RH02.Continent.MEMBERS
COLUMN2 = Geography.RH02.Country.MEMBERS
ROW2

COLUMN1 =
COLUMN2 = Count(Geography.RH02.Country.MEMBERS)

As shown, the report specification of Table IV includes Continent and Country from the Geography hierarchy in the results 156. Further, the report specification calls for a summary operation on members of the Geography hierarchy. Specifically, the report specification calls for a count of countries of each continent.

In one embodiment, the application 150 may generate an OLAP query from the report specification of Table IV. FIG. 8 illustrates an example of the OLAP query, according to one embodiment of the invention. Like the OLAP query 700 of FIG. 7, the OLAP query 800 includes: (i) a first portion 802 that creates a first set of members for the results 156 and (ii) a second portion 804 that creates a second set of members for the results 156. For example, the first set of members may include all Continents that have at least one descendant at the Country level of the hierarchy. The second set of members may include Continents in the hierarchy that do not have any descendants at the Country level of the hierarchy. The application 150 may include a call to GENERATE( ) to combine the first and second sets. Accordingly, the OLAP query 800 prevents members from being erroneously excluded from the results.

Of course, the embodiments described herein are intended to be illustrative and not limiting of the invention, and other embodiments are broadly contemplated. Further, those skilled in the art will recognize that embodiments of the invention may be adapted to support other OLAP queries, other relational database queries, data models for data warehousing other than cubes, and underlying data stored in databases other than relational databases. Further, various OLAP systems may be supported, e.g., multidimensional OLAP (MOLAP), relational OLAP (ROLAP), hybrid OLAP (HOLAP), and data warehousing and OLAP (DOLAP).

Advantageously, embodiments of the invention provide techniques for generating an OLAP query from a report specification for a dimensional hierarchy. In one embodiment, an application determines whether the dimensional hierarchy and/or report specification is likely to produce inaccurate and/or incomplete results. For example, the application may determine if the dimensional hierarchy is unbalanced for the purposes of the report. If so, the application compensates for the dimensional hierarchy being unbalanced (i.e., to prevent members from being incorrectly excluded from the results). Compensation may occur prior to any OLAP query being executed. For example, the application converts the report specification into an OLAP query that includes members having no descendants at the detail level. Consequently, the application generates an OLAP query that, when executed, produces more accurate and/or complete results (i.e., responsive to the report specification). Further, the application may perform compensation only as the application deems necessary (based on the report specification and/or the hierarchy), thus reducing processing overhead incurred from compensation.

While the foregoing is directed to embodiments of the present invention, other and further embodiments of the invention may be devised without departing from the basic scope thereof, and the scope thereof is determined by the claims that follow.

What is claimed is:

1. A computer-implemented method to generate an online analytical processing (OLAP) query for data aggregated in a cube, the cube having a plurality of dimensions, each including a hierarchy of members, the method comprising:
receiving a report specification against a hierarchy of the cube, wherein the hierarchy is a balanced hierarchy having a level with an unbalanced characteristic;
identifying a first set and a second set among the members of the hierarchy, the first set comprising members projected by the report specification that have a descendant at a lowest level of the hierarchy;
the second set comprising members projected by the report specification that do not have any descendant at the lowest level of the hierarchy; and
generating the OLAP query from the report specification and by operation of one or more computer processors, wherein the OLAP query joins the first set with the second set, wherein the OLAP query is executed to produce results responsive to the report specification.

2. The computer-implemented method of claim 1, wherein the first set is joined with the second set by a union operation, wherein the first and second sets are distinct, wherein the report specification does not project the lowest level of the hierarchy but projects at least one level of the hierarchy other than the lowest level of the hierarchy;
wherein the report specification includes a filter, wherein the OLAP query applies the filter to: (i) the first set at the lowest level of the hierarchy and (ii) the second set at a level other than the lowest level of the hierarchy;
wherein the hierarchy is a ragged hierarchy that nevertheless has the unbalanced characteristic based on the level comprising a lowest level of the hierarchy projected by the report specification.

3. The computer-implemented method of claim 2, wherein upon determining, based on a set of predefined conditions, that the hierarchy has a threshold likelihood to cause one or more members of the hierarchy to be incorrectly excluded in producing the results responsive to the report specification, the OLAP query is generated from the report specification in a manner to compensate for the ragged, balanced hierarchy that appears unbalanced, in order to prevent one or more members of the hierarchy of the cube from being incorrectly excluded in producing the results responsive to the report specification.

4. The computer-implemented method of claim 3, wherein upon determining, based on the set of predefined conditions, that a second hierarchy, different from the hierarchy, does not have a threshold likelihood to cause one or more members of the second hierarchy to be incorrectly excluded in producing results responsive to a second report specification, different from the report specification, a second OLAP query, different from the OLAP query, is generated from the second report specification in a manner to not compensate for the second hierarchy.

5. The computer-implemented method of claim 4, wherein the set of predefined conditions consists of a first condition and a second condition, wherein the first condition specifies to compensate upon determining that: (i) the first set, which includes members projected by the report specification, that have a descendant at the lowest level of the hierarchy, precedes another set in the hierarchy in the report specification;

(ii) the hierarchy is unbalanced; and (iii) a set of leaf members are to be built for the hierarchy.

6. The computer-implemented method of claim 5, wherein the second condition specifies to compensate upon determining that: (i) the first set, which includes members projected by the report specification, that have a descendant at the lowest level of the hierarchy, precedes the another set in the hierarchy in the report specification; (ii) the hierarchy is balanced but nevertheless has the unbalanced characteristic based on the lowest level of the hierarchy projected by the report specification; and (iii) the set of leaf members are to be built for the hierarchy.

7. The computer-implemented method of claim 6, wherein the hierarchy being balanced but nevertheless having the unbalanced characteristic comprises: (i) the hierarchy being ragged and (ii) the report specification projecting a detail level comprising the lowest level of the hierarchy;
wherein compensation occurs upon any of the set of predefined conditions being true, wherein compensation does not occur unless specified by the set of predefined conditions.

8. A computer program product to generate an online analytical processing (OLAP) query for data aggregated in a cube, the cube having a plurality of dimensions, each including a hierarchy of members, the computer program product comprising:
a computer-readable memory having computer-readable program code embodied therewith, the computer-readable program code comprising:
computer-readable program code configured to receive a report specification against a hierarchy of the cube, wherein the hierarchy is a balanced hierarchy having a level with an unbalanced characteristic;
computer-readable program code configured to identify a first set and a second set among the members of the hierarchy, the first set comprising members projected by the report specification that have a descendant at a lowest level of the hierarchy;
the second set comprising members projected by the report specification that do not have any descendant at the lowest level of the hierarchy; and
computer-readable program code configured to generate the OLAP query from the report specification and by operation of one or more computer processors when executing the program, wherein the OLAP query joins the first set with the second set, wherein the OLAP query is executed to produce results responsive to the report specification.

9. The computer program product of claim 8, wherein the first set is joined with the second set by a union operation, wherein the first and second sets are distinct, wherein the report specification does not project the lowest level of the hierarchy but projects at least one level of the hierarchy other than the lowest level of the hierarchy;
wherein the report specification includes a filter, wherein the OLAP query applies the filter to: (i) the first set at the lowest level of the hierarchy and (ii) the second set at a level other than the lowest level of the hierarchy;
wherein the hierarchy is a ragged hierarchy that nevertheless has the unbalanced characteristic based on the level comprising a lowest level of the hierarchy projected by the report specification.

10. The computer program product of claim 9, wherein upon determining, based on a set of predefined conditions, that the hierarchy has a threshold likelihood to cause one or more members of the hierarchy to be incorrectly excluded in producing the results responsive to the report specification, the OLAP query is generated from the report specification in a manner to compensate for the ragged, balanced hierarchy that appears unbalanced, in order to prevent one or more members of the hierarchy of the cube from being incorrectly excluded in producing the results responsive to the report specification.

11. The computer program product of claim 10, wherein upon determining, based on the set of predefined conditions, that a second hierarchy, different from the hierarchy, does not have a threshold likelihood to cause one or more members of the second hierarchy to be incorrectly excluded in producing results responsive to a second report specification, different from the report specification, a second OLAP query, different from the OLAP query, is generated from the second report specification in a manner to not compensate for the second hierarchy.

12. The computer program product of claim 11, wherein the set of predefined conditions consists of a first condition and a second condition, wherein the first condition specifies to compensate upon determining that: (i) the first set, which includes members projected by the report specification, that have a descendant at the lowest level of the hierarchy, precedes another set in the hierarchy in the report specification; (ii) the hierarchy is unbalanced; and (iii) a set of leaf members are to be built for the hierarchy.

13. The computer program product of claim 12, wherein the second condition specifies to compensate upon determining that: (i) the first set, which includes members projected by the report specification, that have a descendant at the lowest level of the hierarchy, precedes the another set in the hierarchy in the report specification; (ii) the hierarchy is balanced but nevertheless has the unbalanced characteristic based on the lowest level of the hierarchy projected by the report specification; and (iii) the set of leaf members are to be built for the hierarchy.

14. The computer program product of claim 13, wherein the hierarchy being balanced but nevertheless having the unbalanced characteristic comprises: (i) the hierarchy being ragged and (ii) the report specification projecting a detail level comprising the lowest level of the hierarchy;
wherein compensation occurs upon any of the set of predefined conditions being true, wherein compensation does not occur unless specified by the set of predefined conditions.

15. A system to generate an online analytical processing (OLAP) query for data aggregated in a cube, the cube having a plurality of dimensions, each including a hierarchy of members, the system comprising:
one or more computer processors; and
a memory containing a program which, when executed by the one or more computer processors, is configured to perform an operation comprising:
receiving a report specification against a hierarchy of the cube, wherein the hierarchy is a balanced hierarchy having a level with an unbalanced characteristic,
identifying a first set and a second set among the members of the hierarchy, the first set comprising members projected by the report specification that have a descendant at a lowest level of the hierarchy,
the second set comprising members projected by the report specification that do not have any descendant at the lowest level of the hierarchy, and
generating the OLAP query from the report specification, wherein the OLAP query joins the first set with the second set, wherein the OLAP query is executed to produce results responsive to the report specification.

16. The system of claim 15, wherein the first set is joined with the second set by a union operation, wherein the first and second sets are distinct, wherein the report specification does not project the lowest level of the hierarchy but projects at least one level of the hierarchy other than the lowest level of the hierarchy;
- wherein the report specification includes a filter, wherein the OLAP query applies the filter to: (i) the first set at the lowest level of the hierarchy and (ii) the second set at a level other than the lowest level of the hierarchy;
- wherein the hierarchy is a ragged hierarchy that nevertheless has the unbalanced characteristic based on the level comprising a lowest level of the hierarchy projected by the report specification.

17. The system of claim 16, wherein upon determining, based on a set of predefined conditions, that the hierarchy has a threshold likelihood to cause one or more members of the hierarchy to be incorrectly excluded in producing the results responsive to the report specification, the OLAP query is generated from the report specification in a manner to compensate for the ragged, balanced hierarchy that appears unbalanced, in order to prevent one or more members of the hierarchy of the cube from being incorrectly excluded in producing the results responsive to the report specification.

18. The system of claim 17, wherein upon determining, based on the set of predefined conditions, that a second hierarchy, different from the hierarchy, does not have a threshold likelihood to cause one or more members of the second hierarchy to be incorrectly excluded in producing results responsive to a second report specification, different from the report specification, a second OLAP query, different from the OLAP query, is generated from the second report specification in a manner to not compensate for the second hierarchy.

19. The system of claim 18, wherein the set of predefined conditions consists of a first condition and a second condition, wherein the first condition specifies to compensate upon determining that: (i) the first set, which includes members projected by the report specification, that have a descendant at the lowest level of the hierarchy, precedes another set in the hierarchy in the report specification; (ii) the hierarchy is unbalanced; and (iii) a set of leaf members are to be built for the hierarchy.

20. The system of claim 19, wherein the second condition specifies to compensate upon determining that: (i) the first set, which includes members projected by the report specification, that have a descendant at the lowest level of the hierarchy, precedes the another set in the hierarchy in the report specification; (ii) the hierarchy is balanced but nevertheless has the unbalanced characteristic based on the lowest level of the hierarchy projected by the report specification; and (iii) the set of leaf members are to be built for the hierarchy;
- wherein the hierarchy being balanced but nevertheless having the unbalanced characteristic comprises: (i) the hierarchy being ragged and (ii) the report specification projecting a detail level comprising the lowest level of the hierarchy;
- wherein compensation occurs upon any of the set of predefined conditions being true, wherein compensation does not occur unless specified by the set of predefined conditions.

* * * * *